(12) United States Patent
Beckman

(10) Patent No.: US 11,492,938 B2
(45) Date of Patent: Nov. 8, 2022

(54) CARBON CAPTURE IN AN INTERNAL COMBUSTION ENGINE

(71) Applicant: Applied Resonance Technology LLC, Ham Lake, MN (US)

(72) Inventor: Michael Beckman, Ham Lake, MN (US)

(73) Assignee: APPLIED RESONANCE TECHNOLOGY LLC, Ham Lake, MN (US)

( * ) Notice: Subject to any disclaimer, the term of this patent is extended or adjusted under 35 U.S.C. 154(b) by 0 days.

(21) Appl. No.: 17/188,352

(22) Filed: Mar. 1, 2021

(65) Prior Publication Data

US 2021/0270159 A1    Sep. 2, 2021

Related U.S. Application Data

(60) Provisional application No. 62/983,185, filed on Feb. 28, 2020.

(51) Int. Cl.
```
F01N 3/021      (2006.01)
F02M 35/10      (2006.01)
F01N 1/02       (2006.01)
F02M 21/02      (2006.01)
F01N 3/28       (2006.01)
F01N 13/10      (2010.01)
```
(52) U.S. Cl.
CPC .............. *F01N 3/021* (2013.01); *F01N 1/02* (2013.01); *F01N 3/28* (2013.01); *F01N 13/10* (2013.01); *F02M 21/0209* (2013.01); *F02M 35/10216* (2013.01)

(58) Field of Classification Search
CPC ...................... F02M 21/0206; F02D 19/0644
See application file for complete search history.

(56) References Cited

U.S. PATENT DOCUMENTS

| | | | |
|---|---|---|---|
| 4,141,326 A * | 2/1979 | Wolber | F02B 43/10 123/684 |
| 4,255,789 A | 3/1981 | Hartford et al. | |
| 4,411,223 A | 10/1983 | Kiely | |
| 4,513,728 A | 4/1985 | Ullman et al. | |
| 4,613,304 A | 9/1986 | Meyer | |
| 4,613,779 A | 9/1986 | Meyer | |

(Continued)

FOREIGN PATENT DOCUMENTS

JP    2002013447 A *  1/2002  .......... F01N 3/0857

OTHER PUBLICATIONS

English Translation of JP2002013447A (Year: 2002).*

*Primary Examiner* — Anthony Ayala Delgado
(74) *Attorney, Agent, or Firm* — Larkin Hoffman Daly & Lindgren, LTD.

(57) ABSTRACT

An automobile includes an internal combustion engine having an emission control system, intake manifold and an exhaust manifold. A hydrogen source is positioned to deliver hydrogen to the intake manifold. Hydrogen and gasoline combustion takes place in a cylinder of the internal combustion engine and a catch device is positioned to receive fluid mixture from the exhaust manifold of the internal combustion engine. The catch device condenses the fluid mixture and a filter receives the condensed fluid mixture from the catch device and filters the condensed fluid mixture. A container is positioned to receive the filtered fluid mixture.

16 Claims, 3 Drawing Sheets

(56) References Cited

U.S. PATENT DOCUMENTS

| | | | |
|---|---|---|---|
| 4,798,661 A | 1/1989 | Meyer | |
| 4,826,581 A | 5/1989 | Meyer | |
| 4,936,961 A | 6/1990 | Meyer | |
| 5,149,407 A | 9/1992 | Meyer | |
| 6,226,981 B1 | 5/2001 | Bruch et al. | |
| 6,253,751 B1 | 7/2001 | Carlsson | |
| 6,332,434 B1 | 12/2001 | De et al. | |
| 6,581,375 B2* | 6/2003 | Jagtoyen | F01N 3/043 60/309 |
| 6,651,623 B1 | 11/2003 | Tang et al. | |
| 7,191,737 B2 | 3/2007 | Klein | |
| 7,597,091 B2 | 10/2009 | Suzuki et al. | |
| 7,765,794 B2* | 8/2010 | Alexander | E21B 43/168 60/285 |
| 7,899,606 B2 | 3/2011 | Bartick | |
| 8,336,508 B2 | 12/2012 | Huttner | |
| 8,852,410 B1 | 10/2014 | Turgeon et al. | |
| 8,959,988 B2 | 2/2015 | Inagaki et al. | |
| 8,961,761 B2 | 2/2015 | Maeda | |
| 9,051,872 B2 | 6/2015 | Monros | |
| 9,771,658 B2 | 9/2017 | Haring | |
| 9,771,859 B2 | 9/2017 | Haring | |
| 10,648,379 B2* | 5/2020 | Na | B60L 50/72 |
| 11,118,490 B2* | 9/2021 | Coldren | F01N 3/0205 |
| 11,124,719 B2* | 9/2021 | Quintao Duarte Silva | F23N 5/00 |
| 2003/0159663 A1* | 8/2003 | Zagaja | F02B 43/10 123/3 |
| 2007/0277775 A1* | 12/2007 | Orlosky | F02M 25/14 123/25 C |
| 2008/0092831 A1 | 4/2008 | Simon | |
| 2008/0282612 A1* | 11/2008 | De Bas | F25J 3/067 48/127.7 |
| 2009/0194042 A1* | 8/2009 | Workman | F02M 25/0228 123/3 |
| 2009/0235902 A1* | 9/2009 | Coffey | B60K 15/10 123/536 |
| 2012/0167461 A1* | 7/2012 | Bentzen | C10K 1/06 48/61 |
| 2013/0333638 A1* | 12/2013 | Nishida | F02B 43/00 123/3 |
| 2015/0198108 A1 | 7/2015 | Mullen | |
| 2017/0114756 A1* | 4/2017 | McAlister | F02M 27/04 |
| 2018/0195469 A1* | 7/2018 | Hamad | F02M 26/35 |
| 2018/0219267 A1* | 8/2018 | Martin | H01M 8/04858 |
| 2019/0209961 A1* | 7/2019 | Kennedy | B01J 20/3483 |
| 2020/0400058 A1* | 12/2020 | Fujihara | B60K 6/24 |

* cited by examiner

CARBON CAPTURE IN AN INTERNAL COMBUSTION ENGINE

BACKGROUND

Adding hydrogen to gasoline in an internal combustion engine includes: splitting water, producing a hydrogen and oxygen mixture, combining the mixture with ambient air in the intake manifold, injecting fossil fuel into the cylinder, compressing it with a piston, and igniting the mixture. As a result, in current hydrogen systems, there is less hydrocarbon reaction in the exhaust compared with a gasoline-only conventional internal combustion engine. By utilizing hydrogen in combination with an internal combustion engine, emission from fossil fuel ignition can be reduced.

SUMMARY

An automobile includes an internal combustion engine having an intake manifold and an exhaust manifold. A hydrogen source is positioned to deliver hydrogen to the intake manifold of the internal combustion engine and a catch device is positioned to receive fluid mixture from the exhaust manifold of the internal combustion engine. The catch device condenses the fluid mixture and a filter receives the condensed fluid mixture from the catch device and filters the condensed fluid mixture. A container is positioned to receive the filtered fluid mixture.

DETAILED DESCRIPTION

Figure 1:
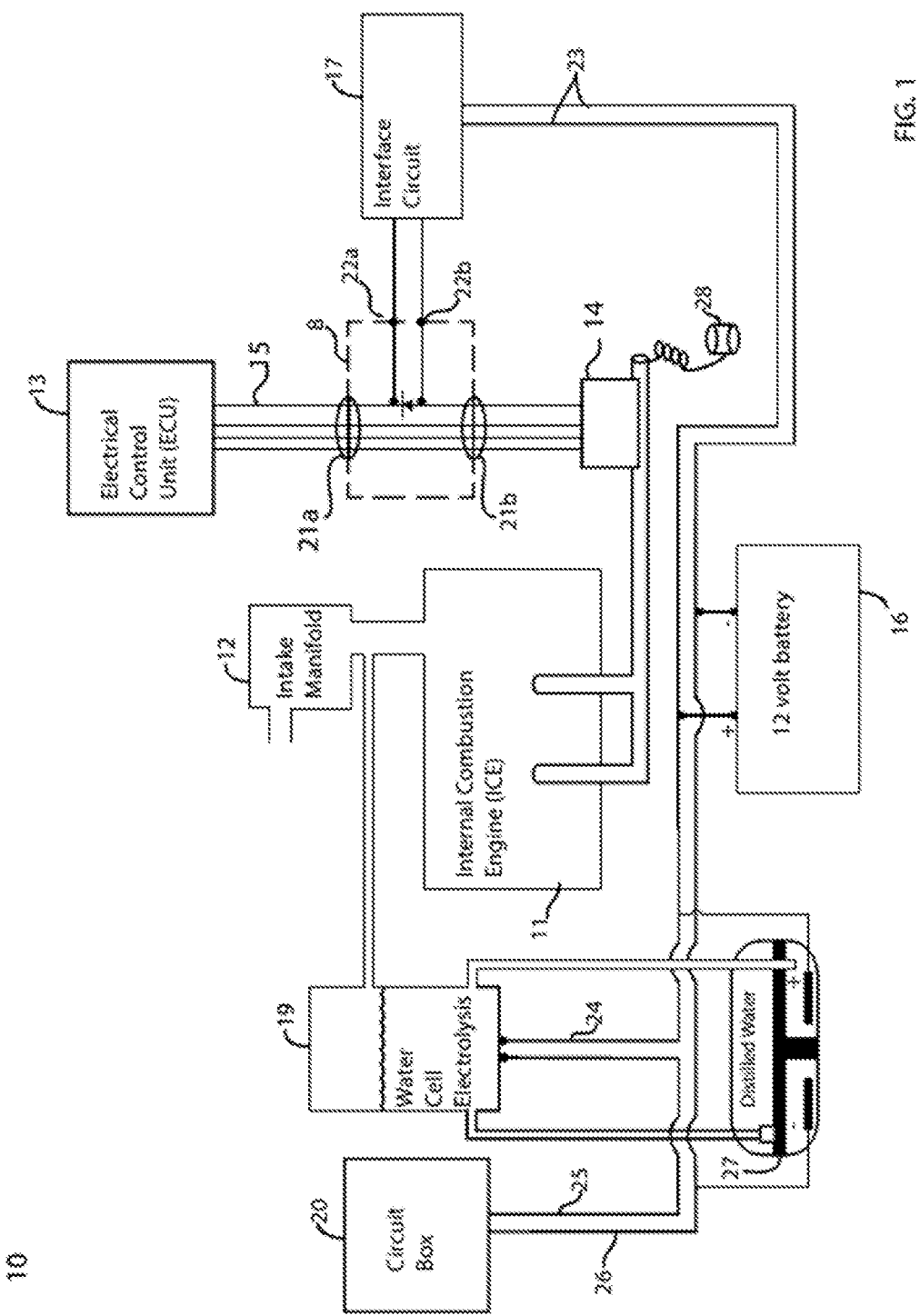
FIG. 1 is a schematic block diagram of an automobile.

FIG. 1 is a schematic diagram of components of an automobile 10, including an internal combustion engine (ICE) 11 having an intake manifold 12. An electrical control unit (ECU) 13 is operatively coupled with the ICE 11 in order to control air to fuel ratio of the mixture provided to the ICE 11 based on signals from an oxygen sensor 14. The ECU 13 and oxygen sensor 14 are communicatively coupled through a wire harness 15.

A battery 16 is coupled with an interface circuit 17 to transform signals from the oxygen sensor 14 to the ECU when hydrogen is being provided to the ICE 11. The interface circuit 17 is coupled to the wire harness 5 through a connection assembly 8 (e.g., a pair of pigtail connections 21a and 21b) in order to provide increased mil-voltages to signals from the oxygen sensor 14 when an electrolysis cell 19 provides hydrogen to the ICE 11. The interface circuit 17 is connected with an input port 22a and an output port 22b of the interface circuit 17. The water cell 19 can be controlled with a suitable circuit box 20. Wires 23 connect the battery with the interface circuit 17.

A wire 24 connects the battery 16 with the electrolysis water cell 19 and a wire 25 connects the electrolysis cell with the circuit box 20. A further wire 26 connects the circuit box 20 with the battery 16. The water cell 19 contains water that will be converted to hydrogen and oxygen by electrolysis. The water cell 19 further includes a water tank 27 that charges negative ions and regulates the impurity of distilled water that is forced to the electrolysis water cell 19 to control amperage.

During operation, power from the battery 16 is provided to the water cell 19, where water within tank 19 is split into hydrogen and oxygen. Hydrogen is then provided into the intake manifold 12 and mixed with ambient air. The fuel (e.g., gasoline) is also injected into the ambient air-hydrogen mixture in the ICE 11. The ICE 11 ignites the mixture to produce power through combustion. Subsequent to the ICE 11, gases and water mixture are exhausted from the ICE 11 as will be discussed below. A cooling coil and capture container 28 can be provided to capture water from the exhaust of the ICE 11.

In a conventional automobile, the oxygen sensor 14 sends a signal to the ECU 13. Dependent upon the signal from the oxygen sensor 14, the ECU 13 will protect various valves and other elements (e.g., a catalytic converter) associated with the ICE 11 by modifying operation of the ICE 11. When hydrogen is further supplied to the intake manifold 12, the oxygen sensor 14 produces a signal indicative of low levels of hydrocarbons in the exhaust of the ICE 11. As a result, the ECU 13 will adjust operation of the ICE 11 to increase enrichment of the fuel.

Figure 2:
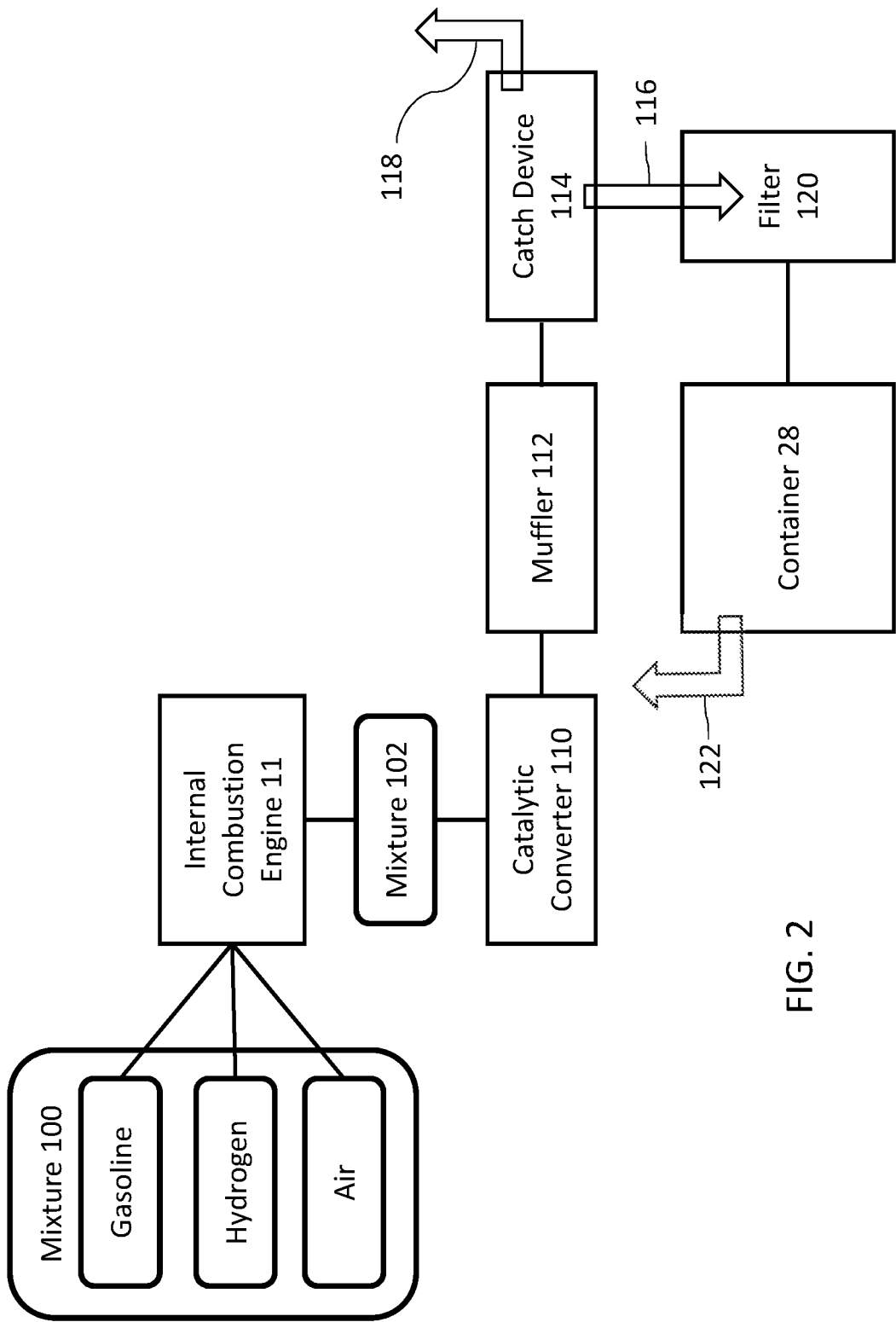
FIG. 2 is a schematic flow diagram of carbon capture in water released from an internal combustion engine.

FIG. 2 is a schematic flow diagram of fluids flowing through automobile 10 according to one embodiment. As discussed above with respect to FIG. 1, a mixture 100 of gasoline, hydrogen and ambient air are provided to ICE 11 (i.e., through the intake manifold). Mixture 100 is ignited within cylinders of the ICE 11, producing a mixture 102 of oxygen and water, which is sent to an exhaust manifold of the ICE 11. Water produced from the ignited mixture includes carbon and nitrogen suspended in the water. In particular, mixture 100 within the ICE 11 creates a plasmatic explosion that cracks hydrocarbon bonds in the gasoline. Water dissolves carbon, nitrogen and other molecules from the mixture 100. The mixture 102 pass through a catalytic convertor 110 and muffler 112 to a catch device 114. The catch device 114 can be formed of a material that exhibits high thermal conductivity, such as copper, carbon steel, stainless steel, nickel alloys and titanium. In one embodiment, the catch device can be a conventional automobile fuel tank formed of metal (e.g., steel, aluminum) or plastic (e.g., high density polyethylene). The catch device 114 condenses the water in mixture 102 and can transmit the condensed water from mixture 102 through a coil 116. Additionally, any gas released from the mixture 102 (e.g., oxygen) can exit the catch device 114 through an outlet 118 such as a conventional tail pipe.

Water from coil 116 is passed through a filter 120, such as a carbon activated filter that operates to remove impurities from the condensed water. Other example filters can scrub contaminants from the water and include membranes and other devices to filter the condensed water. In one embodiment, the filter is a conventional carbon house water filter that includes a carbon block to filter contaminants from the water such as carbon, nitrogen and oil residue. From filter 120, water can be transmitted to container 28. In one embodiment, the container 28 includes a vent 122 open to release oxygen gas from container 28.

Figure 3:
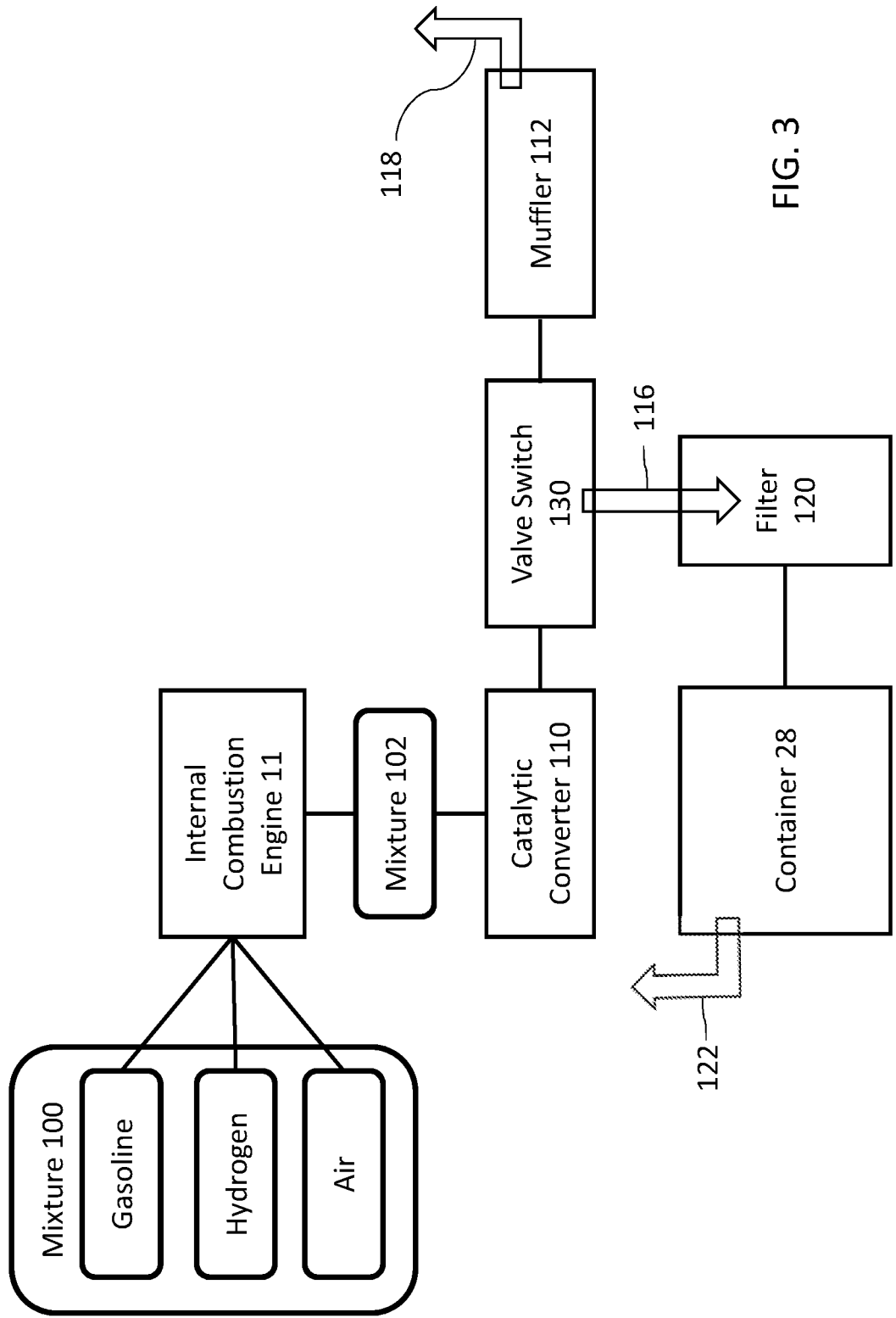
FIG. 3 is a schematic flow diagram of carbon capture in steam released from an internal combustion engine.

In an alternative embodiment, illustrated in FIG. 3, a catch device in the form of a valve switch 130 is positioned between the catalytic converter 110 and the muffler 112. In one embodiment, valve switch 130 can be a 12-volt electric solenoid valve switch. Cooling coil 116 is connected to the valve switch 130 and directs water to the filter 120. Water that is filtered by filter 120 is sent to container 28, with excess gas being released through muffler 112 and tailpipe 118.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. An automobile, comprising:
    an internal combustion engine including an intake manifold and an exhaust manifold;
    an electrolysis cell including a water tank to produce hydrogen and positioned to deliver hydrogen to the intake manifold of the internal combustion engine;
    an interface circuit connected with the internal combustion engine and providing a sigal to the internal combustion engine indicative of the electrolysis cell delivering hydrogen to the intake manifold;
    a gasoline source positioned to deliver gasoline to the intake manifold of the internal combustion engine, wherein the internal combustion engine ignites the hydrogen and gasoline to produce a fluid mixture to the exhaust manifold;
    a catch device positioned to receive the fluid mixture from the exhaust manifold of the internal combustion engine and condense the fluid mixture;
    a filter positioned to receive the condensed fluid mixture from the catch device and filter the condensed fluid mixture; and
    a container positioned to receive the filtered fluid mixture.

2. The automobile of claim 1, wherein the filter is a carbon activated filter.

3. The automobile of claim 1, further comprising a catalytic converter fluidly coupled with the exhaust manifold of the internal combustion engine and configured to deliver the fluid mixture to the catch device.

4. The automobile of claim 3, further comprising a muffler fluidly coupled with the catalytic converter and configured to deliver the fluid mixture from the catalytic converter to the catch device.

5. The automobile of claim 1, further comprising coil tubing fluidly coupling the catch device to the filter.

6. The automobile of claim 1, wherein the catch device valve switch.

7. The automobile of claim 1, wherein the catch device is formed of one of copper, carbon steel, stainless steel, nickel alloys and titanium.

8. The automobile of claim 1, wherein the catch device is formed of metal or plastic.

9. A method of operating an internal combustion engine, comprising:
    producing hydrogen using an electrolysis cell;
    delivering hydrogen to an intake manifold of the internal combustion engine;
    using an interface circuit to provide a signal to the internal combustion engine indicative of hydrogen being provided to the internal combustion engine;
    delivering gasoline to the internal combustion engine;
    igniting the hydrogen and gasoline to produce a fluid mixture to an exhaust manifold;
    condensing fluid mixture from the exhaust manifold of the internal combustion engine;
    filtering the condensed fluid mixture; and
    storing the filtered fluid mixture.

10. The method of claim 9, wherein filtering includes using a carbon activated filter.

11. The method of claim 9, wherein condensing includes positioning a catch device to receive the fluid mixture from a catalytic converter that is fluidly coupled with the exhaust manifold of the internal combustion engine.

12. The method of claim 11, further comprising fluidly coupling a muffler with the catalytic converter and delivering the fluid mixture from the catalytic converter to the catch device.

13. The method of claim 11, further comprising fluidly coupling coil tubing to the catch device.

14. The method of claim 9, wherein condensing the fluid mixture includes capturing steam from the exhaust manifold with an electric valve switch.

15. The method of claim 11, wherein the catch device is formed of one of copper, carbon steel, stainless steel, nickel alloys and titanium.

16. The method of claim 11, wherein the catch device is formed of metal or plastic.

* * * * *

UNITED STATES PATENT AND TRADEMARK OFFICE
CERTIFICATE OF CORRECTION

| | |
|---|---|
| PATENT NO. | : 11,492,938 B2 |
| APPLICATION NO. | : 17/188352 |
| DATED | : November 8, 2022 |
| INVENTOR(S) | : Michael Beckman |

Page 1 of 1

It is certified that error appears in the above-identified patent and that said Letters Patent is hereby corrected as shown below:

In the Claims

Column 3, Line 23, In Claim 1, delete "sigal" and insert -- signal --.

Column 4, Line 3, In Claim 6, after "device" insert -- includes a --.

Column 4, Line 13, In Claim 9, after "delivering hydrogen" insert -- from the electrolysis cell --.

Signed and Sealed this
Tenth Day of January, 2023

*Katherine Kelly Vidal*

Katherine Kelly Vidal
*Director of the United States Patent and Trademark Office*